(12) United States Patent
Krig

(10) Patent No.: US 9,307,029 B2
(45) Date of Patent: Apr. 5, 2016

(54) PROTOCOL EXTENSIONS FOR GENERIC ADVISORY INFORMATION, REMOTE URL LAUNCH, AND APPLICATIONS THEREOF

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1453 days.

(21) Appl. No.: 12/010,867

(22) Filed: Jan. 30, 2008

(65) Prior Publication Data

US 2008/0195749 A1    Aug. 14, 2008

Related U.S. Application Data

(60) Provisional application No. 60/900,708, filed on Feb. 12, 2007, provisional application No. 60/902,063, filed on Feb. 20, 2007.

(51) Int. Cl.
| | | |
|---|---|---|
| G06F 15/16 | (2006.01) | |
| H04L 29/08 | (2006.01) | |
| H04L 29/06 | (2006.01) | |

(52) U.S. Cl.
CPC .............. *H04L 67/14* (2013.01); *H04L 29/06* (2013.01)

(58) Field of Classification Search
CPC ............................... H04L 67/14; H04L 29/06
USPC ................................................. 709/227, 230
See application file for complete search history.

(56) References Cited

U.S. PATENT DOCUMENTS

| | | | | |
|---|---|---|---|---|
| 5,689,431 | A * | 11/1997 | Rudow et al. ................. | 701/454 |
| 7,555,554 | B2 * | 6/2009 | Manders et al. .............. | 709/227 |
| 7,574,655 | B2 * | 8/2009 | Manders et al. .............. | 715/716 |
| 7,664,872 | B2 * | 2/2010 | Osborne et al. ............... | 709/232 |
| 7,673,020 | B2 * | 3/2010 | Rosenbloom et al. ........ | 709/220 |
| 7,711,837 | B2 * | 5/2010 | Bentsen et al. ............... | 709/230 |
| 7,725,360 | B2 * | 5/2010 | Barnes, Jr. .................... | 705/27.1 |
| 8,060,498 | B2 * | 11/2011 | Fiero ............................. | 707/723 |
| 8,073,984 | B2 * | 12/2011 | Lydon et al. ................... | 710/10 |
| 8,176,028 | B2 * | 5/2012 | Rodriguez .................... | 707/706 |
| 9,172,710 | B2 * | 10/2015 | Krig | |
| 2005/0010418 | A1 * | 1/2005 | McNair et al. ................ | 704/275 |
| 2006/0031545 | A1 * | 2/2006 | Manders et al. .............. | 709/230 |
| 2006/0041673 | A1 * | 2/2006 | Sturrock et al. .............. | 709/230 |
| 2006/0174021 | A1 * | 8/2006 | Osborne et al. ............... | 709/230 |
| 2007/0237141 | A1 * | 10/2007 | Marchese ...................... | 370/389 |
| 2008/0005353 | A1 * | 1/2008 | Panabaker et al. ............ | 709/238 |
| 2008/0010255 | A1 * | 1/2008 | Lee et al. ........................... | 707/3 |
| 2008/0052698 | A1 * | 2/2008 | Olson et al. ................... | 717/168 |
| 2008/0267468 | A1 * | 10/2008 | Geiger et al. ................. | 382/128 |
| 2009/0083764 | A1 * | 3/2009 | Davis et al. ................... | 719/321 |
| 2009/0083765 | A1 * | 3/2009 | Davis et al. ................... | 719/321 |
| 2009/0187687 | A1 * | 7/2009 | Hulbert et al. ................. | 710/73 |
| 2009/0228833 | A1 * | 9/2009 | Nakayama .................... | 715/810 |
| 2009/0313376 | A1 * | 12/2009 | Cedervall et al. ............. | 709/227 |
| 2011/0276555 | A1 * | 11/2011 | Fiero ............................. | 707/706 |
| 2011/0320648 | A1 * | 12/2011 | Subbiah et al. ................ | 710/30 |

* cited by examiner

*Primary Examiner* — Douglas Blair
(74) *Attorney, Agent, or Firm* — Sterne, Kessler, Goldstein & Fox PLLC

(57) ABSTRACT

Methods, systems and computer program products to implement extensions of the Media Transport Protocol (MTP) are provided herein. The methods include opening a session between an initiator and a responder, exchanging one or more of device and system information and sending one of an operation or event based on control and status information. The operation includes one or more of a dataset, response code, operation parameter and response parameter. The methods also include sending or receiving one of an operation or event based on remote URL information. The operation includes one or more of a dataset, response code, operation parameter and response parameter. These extensions may be in the form of one or more of an operation, an event, a dataset or property code.

25 Claims, 6 Drawing Sheets

PROTOCOL EXTENSIONS FOR GENERIC ADVISORY INFORMATION, REMOTE URL LAUNCH, AND APPLICATIONS THEREOF

CROSS-REFERENCE TO RELATED APPLICATIONS

This application claims the benefit of U.S. Provisional Application No. 60/900,708 filed Feb. 12, 2007 and U.S. Provisional Application No. 60/902,063 filed Feb. 20, 2007, both of which are incorporated herein by reference in their entirety.

BACKGROUND OF THE INVENTION

1. Field of the Invention

The present invention generally relates to multimedia communication.

2. Background Art

Currently, multiple protocols for the transfer of objects or media object such as audio, video, images and text are in use, one of them being the media transfer protocol (MTP). MTP is an extension of the industry standard picture transfer protocol (PTP). The media transfer protocol was created as an extension to the picture transfer protocol specifically for media devices and includes various provisions for digital rights management (DRM).

Current protocols may use digital rights management (DRM) and electronic license management technologies for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

However, current protocols such as MTP do not provide for exchange of control and status information between an initiator and a responder or remote Uniform Resource Locator (URL) launching capabilities.

Methods and systems are needed to overcome the above mentioned deficiencies.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 3A:
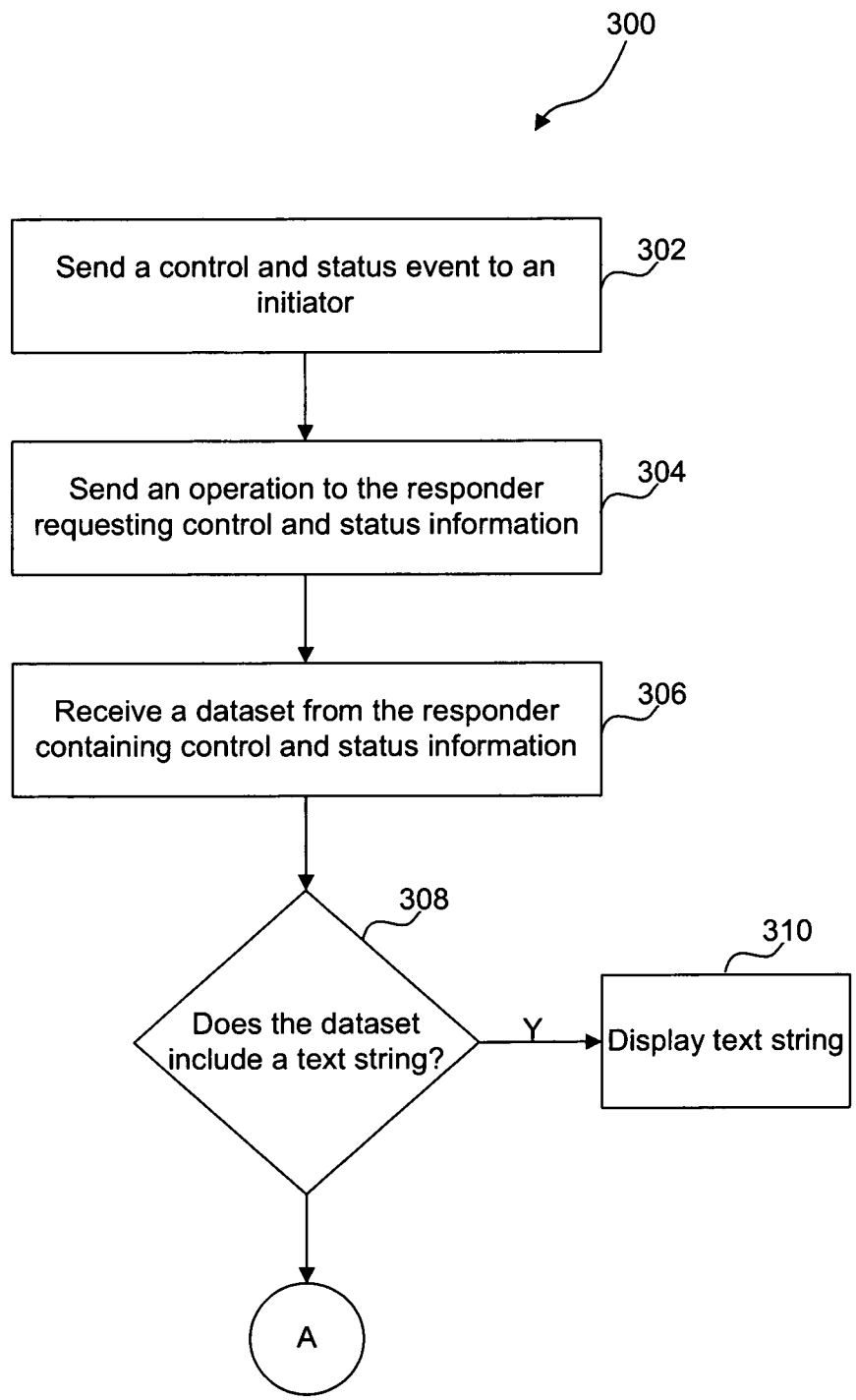
Figure 3B:
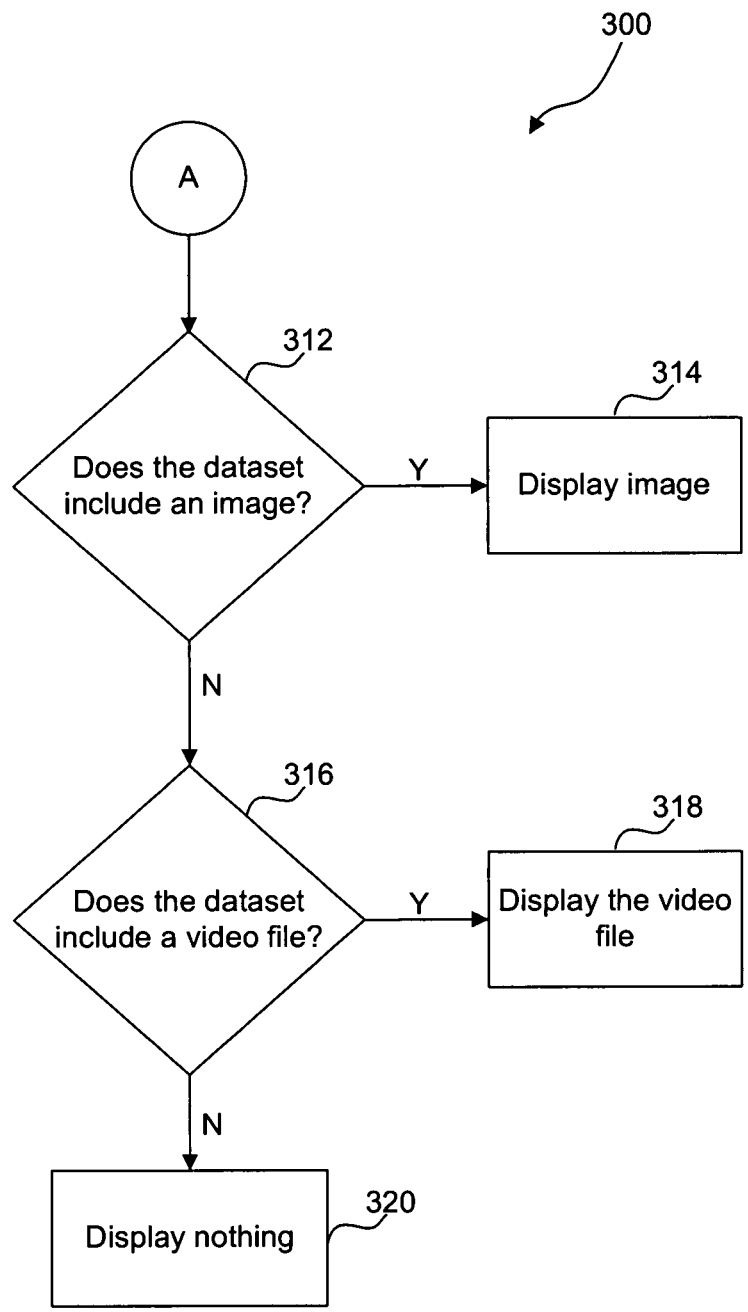

FIGS. 3A-B illustrate an example flow chart illustrating steps performed to exchange control and status information according to an embodiment of the invention.

Figure 4:
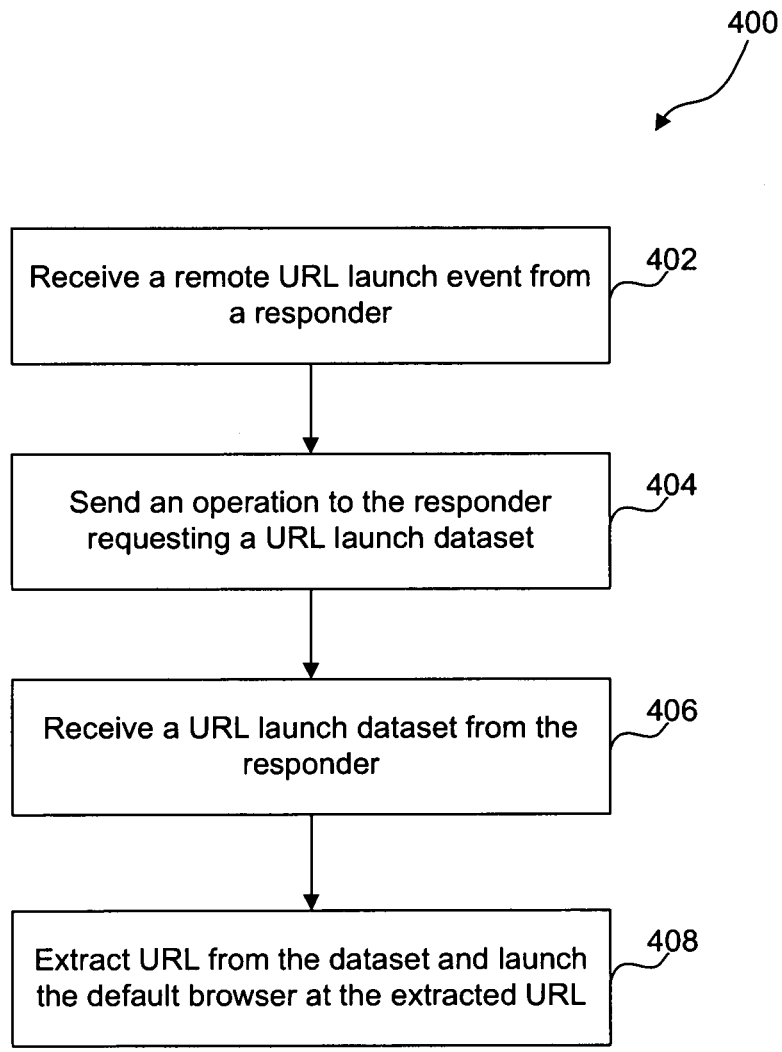

FIG. 4 illustrates an example flow chart illustrating steps performed to remotely launch a URL according to an embodiment of the invention.

Figure 5:
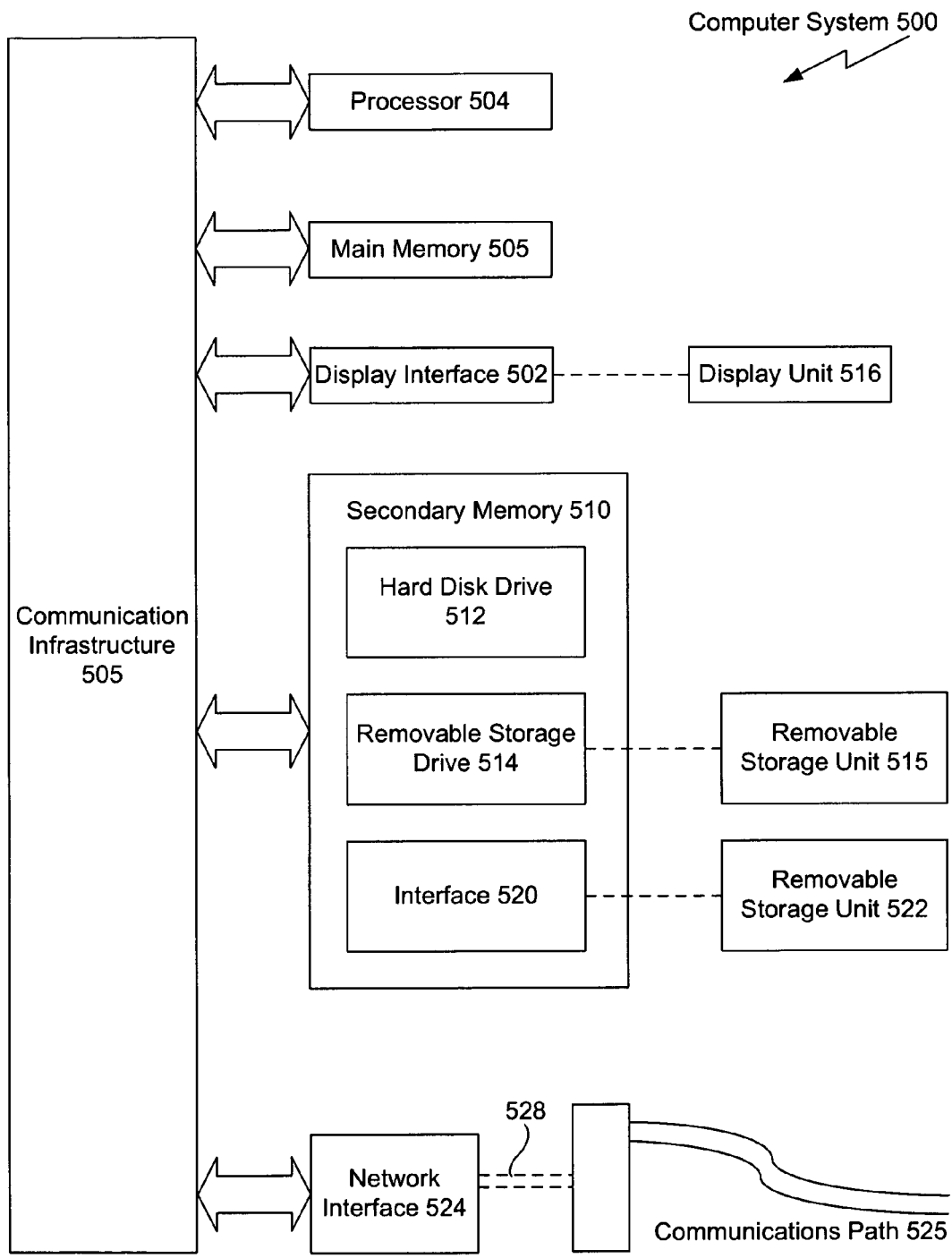

FIG. 5 is a block diagram of a computer system on which the present invention can be implemented.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

1. Overview
2. The Media Transport Protocol
3. An Example Operating Environment
4. Connections between an initiator and a responder
5. Extensions for Control and Status Information Exchange
   5a. Control and Status Dataset
6. Extensions for Remote URL Launch
7. Example General Purpose Computer System
8. Conclusion

1. OVERVIEW

The present invention provides apparatus and methods for extensions to protocols including but not limited to the media transfer protocol (MTP). Aspects of the method and system may comprise exchanging control and status information, launching a Uniform Resource Locator (URL) remotely and specifying properties within one or more extensions of MTP. These extensions may be in the form of one or more of an operation, an event, a dataset or property code.

An operation as referred to herein may be sent by an initiator (as described below with reference to FIG. 1) or responder (described below with reference to FIG. 1). An operation either requests information or provides information in the form of a dataset or property. An operation may include but is not limited to an operation code field (arbitrary value based on design), multiple operation parameters fields, a data field that may include an optional dataset, a field for response code and a plurality of response parameters. The data direction field indicates the direction of data transfer, either from an initiator to a responder or from a responder to an initiator. Response codes include but are not limited to "OK" which indicates that the recipient of the operation accepts the operation, "parameter not supported" which indicates the either an operation or response parameter is not supported, "operation not supported" which indicates that the operation is not supported, "session not open" which indicates that a session is not open, "invalid transaction identification" which indicates that the transaction identification is invalid and "device busy" which indicates that the recipient of the operation is currently unavailable to service the requested operation.

An event as referred to herein may be sent by an initiator or responder and may include but is not limited to a field for event code, multiple fields for event parameters and a data field that may include an optional dataset. An event is used to notify of a change in status of the sending entity.

A property as referred to herein may be sent by an initiator or a responder and may include but is not limited to fields such as a "property code" that identifies the property, "data type" that indicates the data type of the property, "get/set" which indicates whether the responder is to return a value or set a value, "default value" which indicates the default value of the property, "group code" which indicates the group identifier and "form flag" which may be set by the sender of the property.

A dataset as referred to herein may be sent by an initiator or a responder and may include but is not limited to fields such as a "dataset field" that indicates the type of data, a "field order" that indicates the order of the type of data in the dataset, a "length" field that indicates the size of the data and a "datatype" field that indicates the data type of the data.

In an embodiment, each entry under the "dataset field" may be represented by a property, thus a dataset may alternatively be represented as multiple distinct properties. In embodiments, initiators and responders may exchange either entire datasets described herein or individual entries under the dataset field of a dataset that have been encapsulated as properties. For example, with reference to media player application information dataset in table, the "Manufacturer" entry may be represented by a "Manufacturer" property. Thus if only manufacturer information is needed, the manufacturer property can be sent instead of the entire dataset in table 3.

It is to be appreciated that the choice of fields to be included in operations, events and datasets to accomplish the methods described herein are a design choice and may be arbitrary.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

2. THE MEDIA TRANSFER PROTOCOL (MTP)

The media transfer protocol (MTP) is an extension of the industry standard picture transfer protocol (PTP). The media transfer protocol was created as an extension to the picture transfer protocol specifically for media devices and includes various provisions for digital rights management (DRM).

Digital rights management (DRM) and electronic license management technologies may be utilized for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

PIMA 15740:2000 provides a common communication mechanism for exchanging images with and between digital still photography devices (DSPDs). This includes communication between digital still photography devices and host computers, printers, other digital still devices, telecommunications kiosks, and image storage and display devices. This standard presents a protocol that is intended to be transport and platform independent. Exemplary transports include USB (Universal Serial Bus), IEEE 1394, and IrDA (Infrared Data Association).

Behavior requirements for DSPDs include: baseline features a device needs to support to provide interoperability over conforming transports; functional requirements needed by a transport to enable the creation of a transport-dependent implementation specification that conforms to this standard; and a high-level protocol for communicating with and between DSPDs consisting of operation, data, and response phases.

3. EXAMPLE OPERATING ENVIRONMENT

Figure 1:
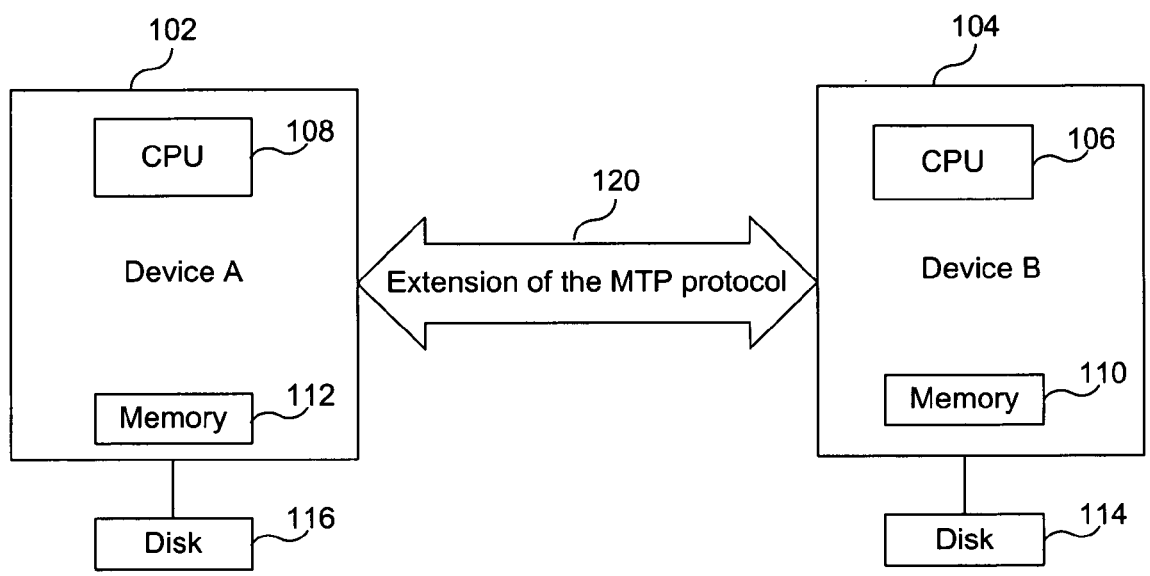
FIG. 1 is a block diagram of an exemplary system comprising a plurality of devices which are communicatively coupled and utilize one or more extensions of the MTP, in accordance with an embodiment of the invention.

FIG. 1 is a block diagram of an exemplary system comprising a plurality of devices which are communicatively coupled and utilize one or more extensions of the MTP, in accordance with an embodiment of the invention.

Referring to FIG. 1 there is shown one or more extensions of the MTP 120 that facilitates communication between a device 102 and a device 104. Extensions 120 may be in the form of one or more of an operation, event or dataset. The system illustrated in FIG. 1 enables a method for transferring extensions 120 of the Media Transfer Protocol (MTP) to and from device 102, which may be a host computer, and device 104 which may be a hand-held device.

The device 102 may comprise suitable logic, circuitry and/or code that may enable transfer of information to and from the device 104 via MTP and at least one extension of the MTP 120. In one embodiment of the invention, the device 102 may be a host computer referred to in MTP specifications as an "initiator", and that may handle the extensions 120 while exchanging for example, media content and messages with the device 104. Media content may be referred to as an "object" or "media object" herein and includes but is not limited to video, audio, images, e-books and any other type of data.

The device 104 may comprise suitable logic, circuitry, and/or code that may enable the transfer of information to and from the device 102 via the MTP and at least one extension of the MTP. In one embodiment of the invention, the device 104 may be a hand-held device referred to in the MTP specification as a "responder", and that may handle the extensions 120 while exchanging, for example, media content and messages with the device 102. It is to be appreciate that initiator 102 and responder 104 may be any computational device, including but not limited to one or more of a portable media player device such as an Motion Picture Experts Group (MPEG) Audio Layer 3 (MP3) player, a mobile communications device such as a cellular phone, a Global Positioning Satellite (GPS) device such as a navigation system, a communications device such as a Wireless Fidelity (WiFi) or internet enabled communications device, a medical device or a device with an embedded controller. In an embodiment, initiator 102 or responder 104 may include computer system 500 or portions of computer system 500 as shown in FIG. 5 and described below.

4. EXAMPLE CONNECTION BETWEEN AN INITIATOR AND A RESPONDER

Figure 2:
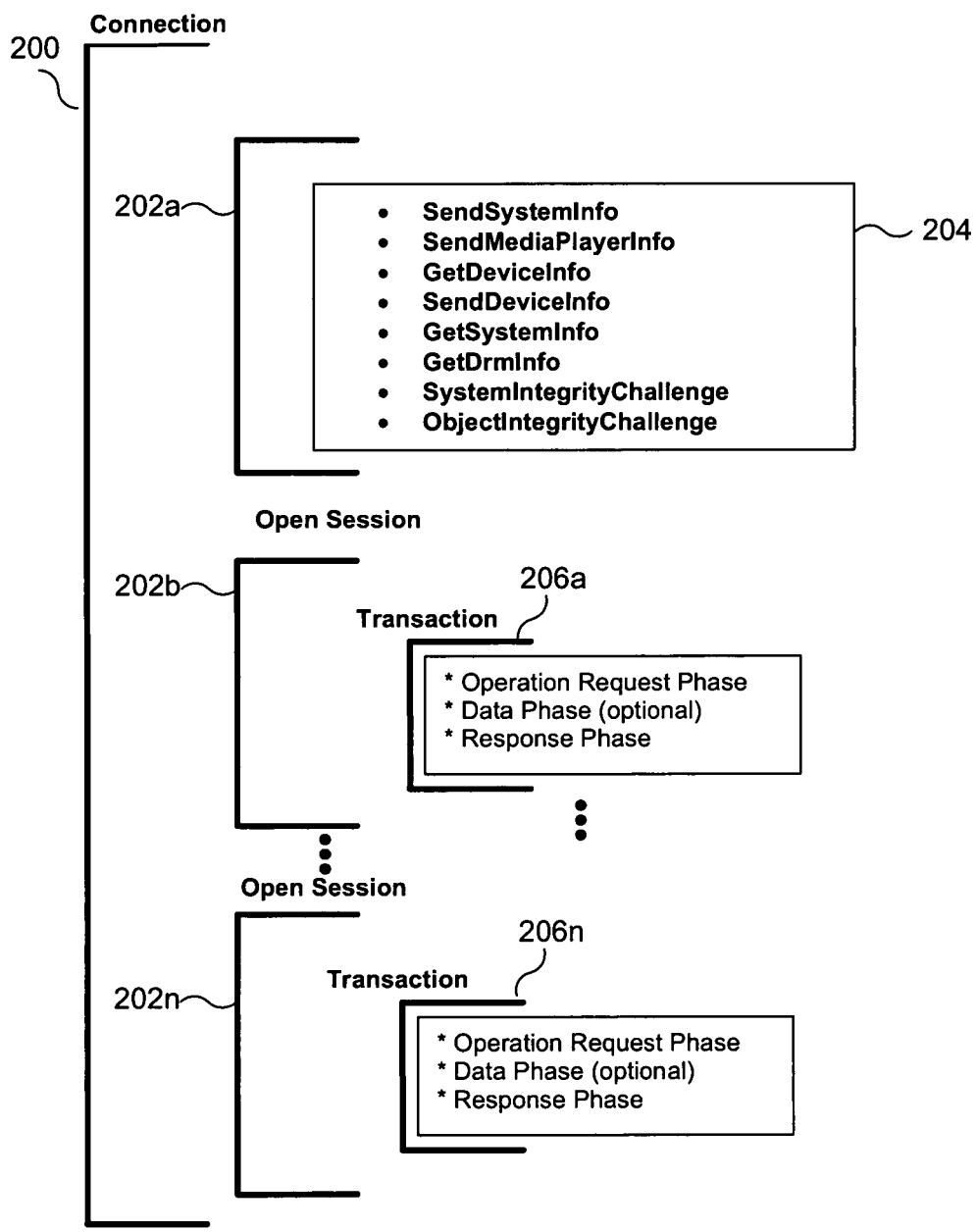
FIG. 2 illustrates an example connection according to an embodiment of the invention.

FIG. 2 illustrates an example connection 200 between initiator 102 and responder 104 according to an embodiment of the invention. Connection 200 between initiator 102 and responder 104 may be via a physical or a wireless medium including but not limited to Universal Serial Bus (USB), Wireless Fidelity (WiFi), Bluetooth, Transport Control Protocol/Internet Protocol (TCP/IP), Infrared Data Association (IrDA). During the life of connection 200, initiator 102 and responder 104 communicate by opening sessions 202 and conducting transactions 206 within open sessions 202. A "transaction" between initiator 102 and responder 104 comprises one or more of an operation, an event and a response. The response may be in the form of an operation or event.

In the duration of connection 200, device and system information 204 is exchanged in the first session 202a between initiator 102 and responder 104. After the exchange of device and system information 204 in first session 202a, further sessions 202b-202n can be conducted without re-exchanging device and system information 204. As a result the overhead of exchanging device and system information 204 at the start of each session 202 is eliminated thereby significantly reducing overhead and speeding up transactions 206 between initiator 102 and responder 104. Another advantage of the present embodiment is that exchanging device and system information 204 at the start of connection 200 allows responder 104 to learn limitations of initiator 102 and configure its internal programs (running on processor 106) accordingly. In an embodiment, responder 104 may disclose to initiator 102 certain predetermined operations, events and properties based on a version of an operating system or media player application running on processor 108 of initiator 102.

In an embodiment, subsequent to a disconnection that terminates connection 200, initiator 102 and responder 104 again exchange system and device information 204 at the start of a new connection (not shown). In this case, initiator 102 and responder 104 re-exchange information in the event that either initiator 102 or responder 104 has changed hardware configuration or software during the connection due to, for example, a system and/or software change/upgrade.

In an embodiment, system and device information includes but is not limited to one or more of transmission protocols supported, driver vendor number, driver vendor ID, operating system used, operating system revision number, operating system patch information, hardware information (manufacturer, make, model and capabilities), internationalization (such as country, language and time zone), media player name and media player version.

5. EXTENSIONS FOR CONTROL AND STATUS FEATURES

FIGS. 3A-B illustrate an example flow chart 300 illustrating steps performed to exchange control and status information according to an embodiment of the invention. Flowchart 300 will be described with continued reference to the example operating environment depicted in FIG. 1. However, the flowchart is not limited to that embodiment. Note that some steps shown in flowchart 300 do not necessarily have to occur in the order shown.

In step 302, a responder sends a control and status event to an initiator to prompt the initiator to send a control and status operation back to the initiator. For example, responder 104 send a control and status event to initiator 102. Table 1 below shows an example event sent from responder 104 to initiator 102 to prompt initiator 102 to send a control and status operation back to responder 104.

TABLE 1

| | |
|---|---|
| Event Code | 0x00E1 |
| Event Parameter 1 | None |
| Event Parameter 2 | None |

In an embodiment, responder 104 may include optional event parameters with the event shown in table 1.

In step 304, in response to the event received in step 302, the initiator sends an operation to the responder requesting control and status information. For example, initiator 102 sends the operation illustrated in table 2 below to responder 104 to request control and status information. In an alternate embodiment, initiator 102 sends the operation in table 2 to request an unsolicited control and status dataset.

TABLE 2

| | |
|---|---|
| Operation Code | 0x9813 |
| Operation Parameter 1 | None |
| Operation Parameter 2 | None |
| Operation Parameter 3 | None |

TABLE 2-continued

| | |
|---|---|
| Operation Parameter 4 | None |
| Operation Parameter 5 | None |
| Data | ControlAndStatus Dataset |
| Data Direction | R -> I |
| ResponseCode Options | OK, Parameter_Not_Supported, No_Information_Available |
| Response Parameter 1 | None |
| Response Parameter 2 | None |
| Response Parameter 3 | None |
| Response Parameter 4 | None |
| Response Parameter 5 | None |

In step 306, the initiator receives a dataset from the responder containing control and status information. For example, initiator 102 receives the dataset shown below in table 3 from responder 104. The control and status dataset contains fields which can be used to provide control and status information in various formats for display, processing, or storage.

TABLE 3

| Dataset field | Field order | Length (bytes) | Datatype |
|---|---|---|---|
| Opcode | 1 | 2 | UINT16 |
| Timestamp | 2 | variable | String |
| Text string | 3 | variable | String |
| Image | 4 | variable | AUINT8 |
| Image type | 5 | 2 | UINT16 |
| Video clip | 6 | Variable | AUINT8 |
| Video clip type | 7 | 2 | UINT16 |
| Audio clip | 8 | Variable | AUINT8 |
| Audio clip type | 9 | 2 | UINT16 |
| Sample data | 10 | 2 | UINT16 |
| form flag | | | MTP Standard Data types in addition to: 0x400A = FLOAT 0x400B = DOUBLE 0x400C = AFLOAT 0x400D = ADOUBLE |
| Sample data | 11 | Variable | DTS (based on the value of the value of the sample data form flag) |

It is to be appreciated that the dataset fields are a design choice and may be arbitrary. The fields of the control and status dataset are described in further detail below.

In step 308, the initiator determines whether the dataset received from the responder in step 306 includes a text string. For example, initiator 102 determines whether the dataset received from responder 104 includes a text string. If it is determined in step 308, that a text string is present in the dataset, then control proceeds to step 310. In step 310, the initiator displays the text string. For example, initiator 102 may display the text string on display unit 516 (see FIG. 5). An example of a text string may be a welcome message or a status message indicating device status of the responder 104 such as "memory full" or "media player application not recognized". If it is determined in step 308, that the dataset does not include a text string, then control proceeds to step 312.

In step 312, the initiator determines whether the dataset received from the responder in step 306 includes an image. For example, initiator 102 determines whether the dataset shown in table 3 sent by responder 104 includes an image. If it is determined that the dataset in step 312 contains an image then control proceeds to step 314. In step 314, the initiator displays the image. For example, initiator 102 may display the image on display unit 516. An example of an image may be an icon. If it is determine in step 312 that the dataset does not include an image then control proceeds to step 316.

In step 316, the initiator determines whether the dataset received from the responder in step 306 includes a video file. For example, initiator 102 determines whether the dataset shown in Table 3 as sent by responder 104 includes a video file. If it is determined in step 316, that the dataset includes a video file, then control proceeds to step 318. In step 318, the initiator displays the video file. For example, initiator 102 displays the video file on display unit 516. An example of a video file may be a "welcome" video. If it is determined in step 316, that the dataset does not include a video file, then control proceeds to step 320.

In step 320, the initiator display nothing. For example, initiator 102 upon determining that the dataset received from the responder in step 306 contains neither a text string, an audio file or a video file displays nothing on display unit 516.

5a. Control and Status Dataset

The control and status dataset shown in table 3 above, contains fields which may be used to provide control and status information in various formats for display, processing or storage by initiator 102. For example, information like icon images, warning messages, or a "Welcome" video clip or audio clip can be sent in the control and status dataset of table 3 by responder 104 (e.g. a portable media player) to initiator 102 (e.g. a personal computer) for display by a media player application running on processor 108 of initiator 102. In an embodiment, the media player application provides a dedicated region (static sized or dynamic sized) within its GUI to display the control and status dataset information as it is received.

In an alternate embodiment, responder 104 may be a portable medical device which sends medical measurement data or images to an initiator 102 which may be a medical device controller to process the measurement data and/or images using processor 108. In an embodiment, the initiator 102 acting as a medical device controller or process control device controller may simply log the information from the control and status dataset of table 3 instead of rendering it immediately.

In yet another embodiment responder 104 is a Global Positioning Satellite (GPS) navigation device which sends and receives multi-format (text, image and/or video formats) navigation information to an initiator 102 which may be a computer system 500 of a car for display on display unit 516.

The opcode field of the dataset in table 3 provides advisory information about the contents of the control and status dataset. Table 4 below illustrates example opcode values and their description according to an embodiment of the invention.

TABLE 4

| Value | Description |
| --- | --- |
| 0x0000 | Generic |
| 0x0001 | Status and advisory information intended for display in a Graphical User Interface (GUI) such as a media player application running on processor 108 of initiator 102 |
| 0x0002 | Generic time-stamped measurement or diagnostic information from, for example, a media player device, a measurement device, a medical device, a GPS device etc. |

In an embodiment, the timestamp field of the dataset in table 3, provides an MTP string representation of a generic time stamp in extended International Organization for Standardization (ISO) 8601 date/time format as: YYYY-MM-DD-HH-MM-SS-MMM-UUU-NNN-PPP. The timestamp string format is described in table 5 below:

TABLE 5

| Place | Meaning | Range | Required |
| --- | --- | --- | --- |
| YYYY | year | 0000 . . . 2007 | Yes |
| MM | Month | 01 . . . 12 | Yes |
| DD | Day | 01 . . . 31 | Yes |
| HH | Hour | 01 . . . 24 | Yes |
| MM | Minute | 01 . . . 60 | Yes |
| SS | Seconds | 01 . . . 60 | Yes |
| MMM | Milliseconds | 000 . . . 999 | Optional |
| UUU | Microseconds | 000 . . . 999 | Optional |
| NNN | Nanoseconds | 000 . . . 999 | Optional |
| PPP | Picoseconds | 000 . . . 999 | Optional |

For example, the time stamp string 2007-01-01-12-30-00 represents Jan. 1, 2007, 12:30 p.m. and 0 seconds. The time stamp string 0000-00-00-00-00-00-120-750 represents 120 milliseconds, 750 microseconds.

The text string field in table 3 provides a message, including but not limited to a status message, greeting, firmware upgrade message, error message, data label and warning message. The status message may indicate, for example, device specifications, memory available for data and number of files stored. The firmware upgrade message may indicate the need for a firmware update along with the version of the current firmware.

The image field in table 3 provides an image which may be of any format, including but not limited to one of a Joint Photographic Experts Group (JPEG) or Graphics Interchange Format (GIF) image which includes animated GIF images. In an embodiment, the image may be including but not limited to, one of an icon, illustration, diagnostic image and map. In an embodiment, when used to display in personal computer based media player applications, the image is no larger than 256×256 resolution.

The image type field specifies a value that indicates the format of the image in the image field. Table 6 below illustrates example image format values and their associated description according to an embodiment of the invention.

TABLE 6

| Value | Description |
| --- | --- |
| 0x3801 | JPEG |
| 0x3807 | GIF |

The video clip field in table 3 provides a video clip which may be of any format, including but not limited to one of a Audio Video Interleaved (AVI), Moving Picture Experts Group (MPEG) and Advanced Streaming Format (ASF). In an embodiment, the video clip may be, including but not limited to one of a "welcome" message video, a video clip advising firmware upgrade to a user or instructions for an end user.

The video type field specifies a value that indicates the format of the video clip in the video field. Table 7 below illustrates example video format values and their associated description according to an embodiment of the invention.

TABLE 7

| Value | Description |
|---|---|
| 0x300A | AVI |
| 0x300B | MPEG |
| 0x3003 | ASF |

In an embodiment, for media player applications running on processor 108 of initiator 102, the video clip may be limited to 30 seconds or less and have a reduced resolution to fit within a 256×256 frame.

The audio clip field in table 3 provides an audio clip which may be of any format, including but not limited to one of a Audio Interchange File Format (AIFF), Waveform audio format (WAV) and Motion Picture Experts Group Audio Layer 3 (MP3) format. In an embodiment, the audio clip may be, including but not limited to one of a "welcome" message, an audio clip advising firmware upgrade, indicating that a disk is full, or providing instructions to an end user.

The audio type field specifies a value that indicates the format of the audio clip in the audio field. Table 8 below illustrates example audio format values and their associated description according to an embodiment of the invention.

TABLE 8

| Value | Description |
|---|---|
| 0x3007 | AIFF |
| 0x3008 | WAV |
| 0x3009 | MP3 |

In an embodiment, for media player applications running on processor 108 of initiator 102, the audio clip may be limited to 60 seconds or less.

In an embodiment, the sample data form flag field in table 3 indicates allowable values for the data in the sample data field. Examples of allowable values are listed in section 3.2.1 Simple data types of the MTP specification. In addition to standard MTP data types specified by the MTP specification, table 9 below specifies addition numeric data types.

TABLE 9

| Data Type code | Type | Description |
|---|---|---|
| 0x400A | FLOAT (4 bytes) | Floating point (IEEE 754 format) |
| 0x400B | DOUBLE (8 bytes) | Double precision (IEEE 754 format) |
| 0x400C | AFLOAT | Array of Float |
| 0x400D | ADOUBLE | Array of Double |

The AFLOAT and ADOUBLE data type are defined according to the standard MTP array format specified in section 3.2.2.1 Array Definition of the MTP specification.

In an embodiment, the sample data field in table 3 provides data including but not limited to one or more of floating point measurement data, EXtensible Markup Language (XML) code and encoded data. The sample data field may be used to provide data for measuring devices, medical devices, or process control devices. The data in the sample data field is processed by processor 108 of initiator 102 based in part on the value in the sample data form flag field that indicates the data type. The interpretation and use of data in the sample data is application specific and applicable to measurement devices and process control devices.

In an embodiment, initiator 102 sends control and status dataset in table 3 to responder 104 using the operation show in table 10 below.

TABLE 10

| | |
|---|---|
| Operation Code | 0x9814 |
| Operation Parameter 1 | None |
| Operation Parameter 2 | None |
| Operation Parameter 3 | None |
| Operation Parameter 4 | None |
| Operation Parameter 5 | None |
| Data | ControlAndStatus Dataset |
| Data Direction | I -> R |
| ResponseCode Options | OK, Parameter_Not_Supported |
| Response Parameter 1 | None |
| Response Parameter 2 | None |
| Response Parameter 3 | None |
| Response Parameter 4 | None |
| Response Parameter 5 | None |

In an embodiment, the operation in table 10 may be sent by initiator 102 even if it is unsolicited by responder 104.

6. EXTENSIONS FOR REMOTE URL LAUNCH

In an embodiment, extensions provided herein enable an initiator 102 to request a remote Uniform Resource Locator (URL) from a responder 104 and launch a default browser at the URL indicated by the responder 104.

FIG. 4 illustrates an example flow chart 400 illustrating steps performed to remotely launch a URL according to an embodiment of the invention. Flowchart 400 will be described with continued reference to the example operating environment depicted in FIG. 1. However, the flowchart is not limited to that embodiment. Note that some steps shown in flowchart 400 do not necessarily have to occur in the order shown.

In step 402, a responder sends a remote URL launch event to an initiator. For example, responder 104 sends a remote URL launch event as shown in table 11 to initiator 102. The remote URL launch event requests a remote URL launch.

TABLE 11

| | |
|---|---|
| Event Code | 0x00F1 |
| Event Parameter 1 | None |
| Event Parameter 2 | None |

In step 404, the initiator sends an operation to the responder requesting a URL launch dataset. For example, initiator 102 sends the operation illustrated in Table 12 below to responder 104 requesting a remote URL launch dataset.

TABLE 12

| Dataset field | Field order | Length (bytes) | Datatype |
|---|---|---|---|
| URL | 1 | variable | String |

In step 406, the initiator receives a URL launch dataset from the responder. For example, initiator 102 receives the dataset shown in Table 12 from responder 104 in response to the operation sent in step 404.

In step 408, the initiator extracts a URL from the dataset received in step 406 and launches a default browser at the extracted URL. For example, initiator 102 extracts the URL from the dataset shown in Table 12 and launches a default browser using processor 108 at the extracted URL.

It is to be appreciated that the embodiments presented herein may be implemented in any existing or future protocol besides MTP including but not limited to Picture Transfer Protocol (PTP), HTTP (Hyper Text Transfer Protocol), POP3 (Post Office Protocol 3), SMTP (Simple Mail Transfer Protocol), FTP (File Transfer Protocol), IP (Internet Protocol), DHCP (Dynamic Host Configuration Protocol), IMAP (Internet Message Access Protocol), ISDN Integrated Services Digital Network, PDH Plesiochronous Digital Hierarchy, T-carrier (T1, T3, etc.), E-carrier (E1, E3, etc.), RS-232, a serial line interface originally developed to connect modems and computer terminals, SDH Synchronous Digital Hierarchy, SONET Synchronous Optical NETworking, Layer 2 protocols (Data link layer), ARCnet, CDP Cisco Discovery Protocol, DCAP Data Link Switching Client Access Protocol, Econet, Ethernet, FDDI Fiber Distributed Data Interface, Frame Relay, HDLC High Level Data Link Control, LocalTalk, L2F Layer 2 Forwarding Protocol, L2TP Layer 2 Tunneling Protocol, LAPD Link Access Procedures on the D channel, LLDP Link Layer Discovery Protocol, LLDP-MED Link Layer Discovery Protocol—Media Endpoint Discovery, PPP Point-to-Point Protocol, PPTP Point-to-Point Tunneling Protocol, SLIP Serial Line Internet Protocol, Layer 4 protocols (Transport layer), IL Originally developed as transport layer for 9P, RTP Real-time Transport Protocol, SPX Sequenced Packet Exchange, SCTP Stream Control Transmission Protocol, TCP Transmission Control Protocol, UDP User Datagram Protocol, Sinec H1 for telecontrol, Layer 5 protocols (Session layer), 9P Distributed file system protocol developed originally as part of Plan 9, NCP NetWare Core Protocol, NFS Network File System, SMB Server Message Block (aka CIFS Common Internet FileSystem), Layer 7 protocols (Application layer), AFP pple Filing Protocol, BACnet Building Automation and Control Network protocol, BitTorrent, a peer-to-peer file sharing protocol, BOOTP Bootstrap Protocol, DIAMETER, an authentication, authorization and accounting protocol, DICT Dictionary protocol, DNS Domain Name Service, DHCP Dynamic Host Configuration Protocol, FTP File Transfer Protocol, Finger which gives user profile information, Gnutella—a peer-to-peer file-swapping protocol, Gopher, a precursor of web search engines, HTTP HyperText Transfer Protocol, used in the World Wide Web, SMTP Simple Mail Transfer Protocol, SNMP Simple Network Management Protocol and SOAP Simple Object Access Protocol.

7. EXAMPLE GENERAL PURPOSE COMPUTER SYSTEM

The present invention may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

In fact, in one embodiment, the invention is directed toward one or more computer systems capable of carrying out the functionality described herein. An example of a computer system 500 is shown in FIG. 5. In an embodiment, initiator 102 and/or responder 104 may include computer system 500 or portions of computer system 500 and be configured to perform the steps in flowcharts 300 and 400. For example, processor 108 of initiator 102 or processor 106 of responder 104 may be processor 504 of computer system 500, and be configured to execute instructions to perform the steps in flowcharts 300 and 400.

Computer system 500 includes one or more processors, such as processor 504. Processor 504 is connected to a communication infrastructure 505 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from communication infrastructure 506 (or from a frame buffer not shown) for display on display unit 516.

Computer system 500 also includes a main memory 505, preferably random access memory (RAM), and may also include a secondary memory 510. Secondary memory 510 may include, for example, a hard disk drive 512 and/or a removable storage drive 514, representing a floppy disk drive, a magnetic tape drive, an optical disk drive, etc. Removable storage drive 514 reads from and/or writes to a removable storage unit 515 in a well known manner. Removable storage unit 515 represents a floppy disk, magnetic tape, optical disk, etc. which is read by and written to by removable storage drive 514. As will be appreciated, removable storage unit 515 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 515 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 515 and interfaces 520, which allow software and data to be transferred from removable storage unit 515 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 525. This channel 525 carries signals 528 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 514, a hard disk installed in hard disk drive 512, and signals 528. These computer program products provide software to computer system 500. The invention is directed to such computer program products.

Computer programs (also referred to as computer control logic) are stored in main memory 505 and/or secondary memory 510. Computer programs may also be received via communications interface 524. Such computer programs, when executed, enable computer system 500 to perform the features of the present invention, as discussed herein. In particular, the computer programs, when executed, enable processor 504 to perform the features of the present invention. Accordingly, such computer programs represent controllers of computer system 500.

In an embodiment where the invention is implemented using software, the software may be stored in a computer program product and loaded into computer system 500 using removable storage drive 514, hard drive 512 or communications interface 524. The control logic (software), when executed by processor 504, causes processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

8. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, in an initiator, to exchange remote Uniform Resource Locator (URL) information with a responder operating under a data transfer protocol, comprising:
    opening a session with the responder;
    receiving an event from the responder requesting a remote URL launch;
    sending a first operation to the responder requesting a dataset having a remote URL in response to receiving the event; and
    receiving a second operation from the responder that includes the dataset having remote URL information in response to the first operation;
    extracting the remote URL information from the dataset in response to receiving the second operation; and
    launching the remote URL using a default browser.

2. The method of claim 1, wherein the data transfer protocol is one of a Media Transport Protocol (MTP) or a Picture Transfer Protocol (PTP).

3. The method of claim 1, further comprising determining whether the dataset includes a text string.

4. The method of claim 3, further comprising determining whether the dataset includes an image, if the dataset does not contain the text string, and displaying the image if it is present.

5. The method of claim 4, further comprising determining whether the dataset includes a video, if the dataset does not include the image, and displaying the video if it is present.

6. The method of claim 1, wherein the dataset includes one or more of a timestamp, a text string, an image, an image type, a video file, a video file type, an audio file, an audio file type, a sample data form flag and sample data.

7. The method of claim 1, wherein the receiving and sending are performed under extensions of a Media Transport Protocol (MTP).

8. The method of claim 1, further comprising exchanging one or more of device and system information with the responder prior to the sending, wherein the exchanging step is performed only once per session.

9. The method of claim 1, wherein the first operation or the second operation includes one or more of a dataset, a response code, an operation parameter, and a response parameter.

10. The method of claim 1, wherein the first operation or the second operation requests information or provides information in the form of a dataset or a property.

11. The method of claim 1, wherein the event provides notice of a change in status of an entity that sends the event.

12. The method of claim 1, wherein the responder is a portable medical device and the initiator is a medical device controller.

13. The method of claim 1, wherein the responder is a Global Positioning Satellite (GPS) navigation device and the initiator is a computer system of a car.

14. An initiator to exchange remote Uniform Resource Locator (URL) information with a responder operating under a data transfer protocol, comprising:
    a processor;
    a memory in communication with the processor, wherein the memory stores a plurality of processing instructions for directing the processor to perform operations comprising:
        opening a session with the responder;
        receiving an event from the responder requesting a remote URL launch;
        sending a first operation to the responder requesting a dataset having a remote URL in response to receiving the event;
        receiving a second operation from the responder that includes the dataset having remote URL information in response to the first operation;
        extracting the remote URL information from the dataset in response to receiving the second operation; and
        launching the remote URL using a default browser.

15. The initiator of claim 14, wherein the initiator or the responder is one of a computational device, a portable media player device, a mobile communications device, a Global Positioning Satellite (GPS) device, a communications device or a medical device.

16. The initiator of claim 14, wherein the data transfer protocol is one of a Media Transport Protocol (MTP) or a Picture Transfer Protocol (PTP).

17. The initiator of claim 14, wherein the operations further comprise: exchanging one or more of device and system information with the responder prior to the sending, wherein the exchanging is performed only once per session.

18. The initiator of claim 14, wherein the first operation or the second operation includes one or more of a dataset, a response code, an operation parameter and a response parameter.

19. The initiator of claim 14, wherein the first operation or the second operation requests information or provides information in the form of a dataset or a property.

20. The initiator of claim 14, wherein the event is configured to notify of a change in status of the responder.

21. A responder to exchange remote Uniform Resource Locator (URL) information with an initiator operating under a data transfer protocol, comprising:
 a processor;
 a memory in communication with the processor, wherein the memory stores a plurality of processing instructions for directing the processor to:
  open a session with the initiator;
  send an event to the initiator requesting a remote URL launch;
  receive a first operation from the initiator requesting a dataset having a remote URL in response to receiving the event; and
  send a second operation to the initiator that includes the dataset having remote URL information in response to the first operation for the initiator to extract the remote URL information from the dataset in response to receiving the second operation, and launch the remote URL using a default browser.

22. The responder of claim 21, wherein the plurality of processing instructions further direct the processor to:
 exchange one or more of device and system information with the responder prior to sending the event, wherein the exchange is performed only once per session.

23. The responder of claim 21, wherein the first operation or the second operation includes one or more of a dataset, a response code, an operation parameter and a response parameter.

24. The responder of claim 21, wherein the first operation or the second operation requests information or provides information in the form of a dataset or a property.

25. The responder of claim 21, wherein the event is configured to notify of a change in status of the responder.

\* \* \* \* \*